United States Patent Office.

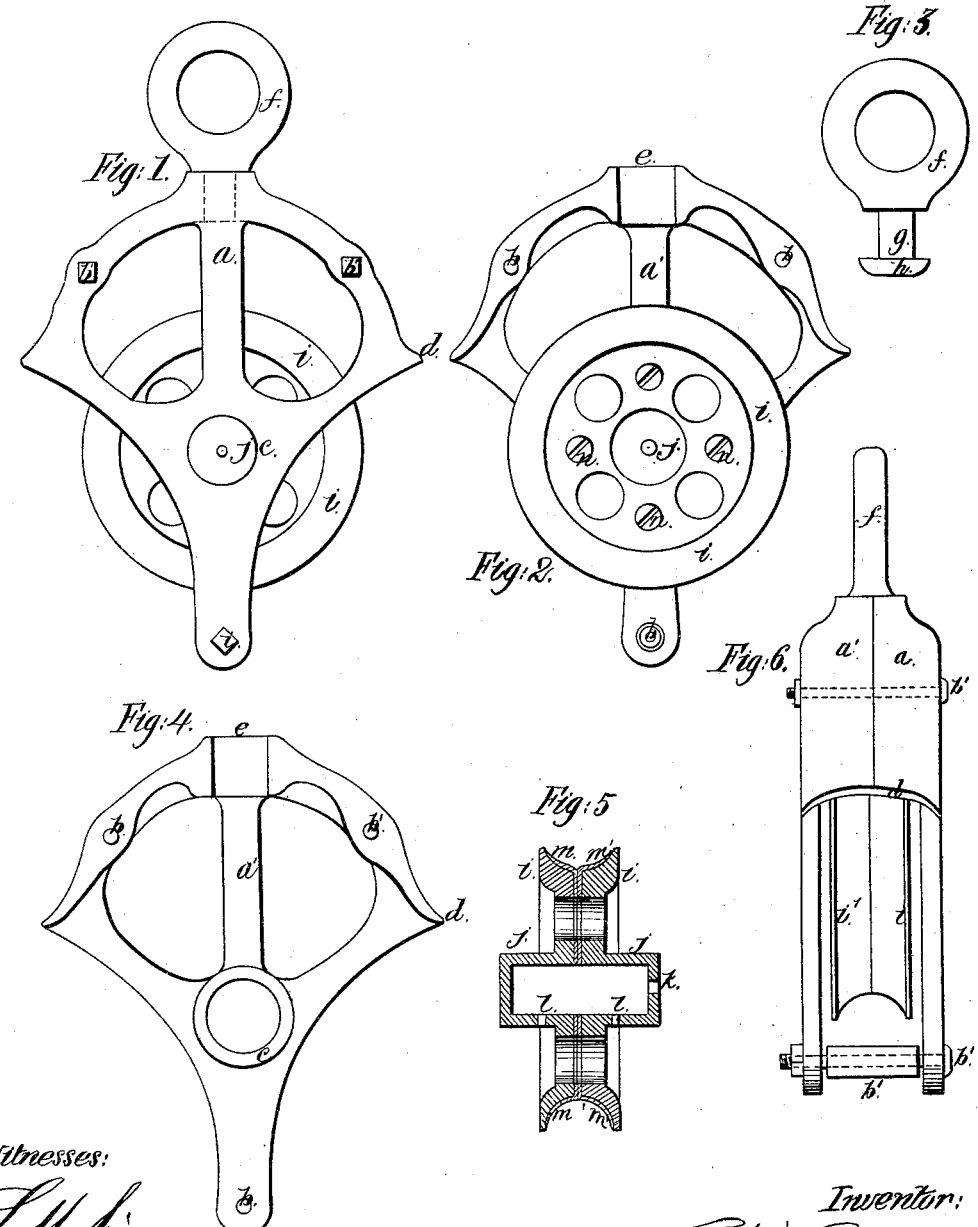

GEORGE W. GREGORY, OF WATERTOWN, NEW YORK.

Letters Patent No. 90,525, dated May 25, 1869.

IMPROVEMENT IN METAL PULLEY-BLOCKS.

The Schedule referred to in these Letters Patent and making part of the same.

*To all whom it may concern:*

Be it known that I, GEORGE W. GREGORY, of Watertown, Jefferson county, State of New York, have invented certain new and useful Improvements in Metal Pulley-Blocks, for Hoisting, &c.; and I do hereby declare the following to be a full, clear, and exact description of the construction of the same, reference being had to the accompanying drawings, making a portion of this description, and in which like letters are used to designate like parts.

Figure 1 represents a side view of the improved pulley;

Figure 2 represents the pulley with one of its sides removed;

Figure 3 represents the swivel or eye;

Figure 4 represents a view of one of the side frames;

Figure 5, a transverse section of the wheel or sheave; and

Figure 6, an end view of the pulley.

$a\ a'$ designate two frames of metal with open sides, for lightness, and preferably cast, and having holes, $b$, to receive bolts $b'$, to hold the frame together.

Each frame, at top, has a semi-cylindrical opening, $c$, in which fits cylindrical shank $g$ of the swivel $f$, having at its bottom a button, $h$, to prevent the removal of the swivel from the cylindrical opening formed by placing the sides $a\ a'$ together.

The frames have each a large opening $c$, for a bearing for the hub of the wheel or sheave, and these bearings have in them a groove, which may be packed with leather or hide, or any metal usually used for bearings in machinery.

The pulley-wheel or sheave is made or cast in two parts, $i\ i'$, having hubs $j\ j'$, to be packed with any suitable packing and lubricator.

It has also oil-outlets $l\ l$, and inlet $k$.

The rope used on pulleys wears away rapidly, and to prevent this, the groove of the wheel is lined with sheet-lead, or any suitable material, in the following manner:

The edges of two strips of the lining $m\ m'$ are placed between the halves $i\ i'$ of the wheel, which are then screwed together by screws, rivets, or bolts, as at $n$.

The lining is then turned over in the grooves of the pulley, as shown in fig. 5, forming a lead or smooth surface.

Having secured the lining between the halves $i\ i'$, and packed the hub-bearings $c$, and packed the hub $j\ j'$, the wheel is inserted in the frames $a\ a'$, the hubs $j\ j'$ resting in bearings $c$, the swivel is placed in its opening $e$, and the frames $a\ a'$ are then secured together by the bolts and nuts $b'$.

Before using the pulley, oil is poured in the hub $j$, through the inlet $k$, and this oil, as the wheel rotates, passes out through the outlets $l\ l$, on the bearings $c$, and lubricates them.

The edges $d\ d$ of the frame are curled or rounded, to prevent wear on the rope.

The wheel may be lined with leather, instead of sheet-lead or other soft metal.

Having described my invention,

What I claim, and desire to secure by Letters Patent, is—

1. A pulley-wheel, made or cast in two parts, and having secured between its parts strips of lead, or equivalent material, substantially as and for the purpose described.

2. A pulley-wheel, having attached thereto the bearing-hubs, made hollow, and provided with inlet and outlet-passages for oil, substantially as set forth.

3. The combination of a divided frame and swivel, constructed as described, with a wheel having a grooved lining, as described.

4. The combination of a divided frame and swivel, as described, with a wheel, and means for lubricating and packing the bearings of the same, substantially as set forth.

In witness whereof, I have signed my name to this specification, in the presence of—

GEO. W. GREGORY.

Witnesses:
JOHN S. HOLLINGSHEAD,
JOHN S. HOLLINGSHEAD, Jr.